United States Patent [19]

Nishimura

[11] Patent Number: 4,525,822
[45] Date of Patent: Jun. 25, 1985

[54] OPTICAL DATA RECORDATION AND REPRODUCTION SYSTEM

[75] Inventor: Nobuo Nishimura, Kanagawa, Japan

[73] Assignee: Fuji Xerox Company, Limited, Tokyo, Japan

[21] Appl. No.: 354,673

[22] Filed: Mar. 4, 1982

[30] Foreign Application Priority Data

May 29, 1981 [JP] Japan .................................. 56-81280

[51] Int. Cl.³ .............................................. G11B 7/00
[52] U.S. Cl. ...................................... 369/44; 369/59; 369/124; 375/87
[58] Field of Search ...................... 369/44, 45, 111, 59, 369/124, 121, 122; 360/32, 40; 375/87, 55, 49, 25

[56] References Cited

U.S. PATENT DOCUMENTS

| 3,983,317 | 9/1976 | Glorioso | 369/118 |
| 3,988,532 | 10/1976 | Korpel | 369/124 |
| 4,222,072 | 9/1980 | Bailey | 360/32 |
| 4,281,292 | 7/1981 | Caldarella | 375/87 |
| 4,353,130 | 10/1982 | Carasso | 369/59 |
| 4,410,877 | 10/1983 | Carasso | 369/59 |

OTHER PUBLICATIONS

"An Experimental Approach to Digital Television Recording", by Jones et al., Int'l Broadcasting Convention, London, 9/23/74, pp. 114–118.

Primary Examiner—Alan Faber
Attorney, Agent, or Firm—Sughrue, Mion, Zinn, Macpeak and Seas

[57] ABSTRACT

An optical data recordation and reproduction system comprising a first optical means modulates a light beam with digitized data and impacts this modulated light beam onto a photosensitive material, producing discontinuities in the photosensitive material corresponding to the data. A second optical means then directs a beam of unmodulated light onto this photosensitive material, and converts the resulting modulated light into an electric signal. An electric circuit then differentiates and samples the signal, producing the recorded digitized data via self-locking.

11 Claims, 19 Drawing Figures

FIG. 2(a) 1 0 0 0 1 1 0 1 1

FIG. 2(f) 1 0 0 0 1 1 0 1 1
FIG. 2(b') 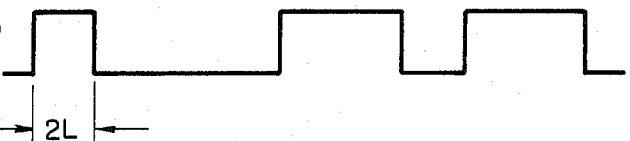
FIG. 2(c') 
FIG. 2(d') 

OPTICAL DATA RECORDATION AND REPRODUCTION SYSTEM

BACKGROUND OF THE INVENTION

1. Field of the Invention

This invention relates to a method in which information is recorded and reproduced from a circular data recording medium. In the recordation cycle, a light beam is modulated with the data and is applied to a light sensitive medium. In the reproduction cycle, a light beam of lower power than the light beam which was used in the recordation cycle is applied to the light sensitive medium, such that the variation in intensity of the light beam, as it is reflected from or passed through the medium, is detected to reproduce the data.

2. Description of the Prior Art

Magnetic disks are well known in the prior art as large capacity memories. In writing binary data in such a circular data recording medium, since it is coated with ferromagnetic material, the magnetization of the disk can be inverted at selected points according to the binary data which is to be recorded. In reproducing the data as written into the recording medium, the variations in magnetic flux due to the inverse-magnetized portions of the recording medium are detected and converted into an electrical current signal. Magnetic tapes are also well known as large capacity memories, and the writing and reading cycles of such magnetic tapes are substantially the same as those cycles of the aforementioned magnetic disk. However, since sequential access must be employed to read data from a magnetic tape, it cannot be employed as a large capacity memory in which especially short access time is required.

Recently, a so-called "optical disk device", in which data is recorded and reproduced by applying a light beam to a circular data recording medium, has also been used as a memory. The optical disk device offers the large capacity of a magnetic tape device, while also realizing the fast access time of a magnetic disk device. During the recording cycle of this device, the focusing lens of a laser optical system is focussed on an opaque film formed on a disk, sublimating the opaque film partially and forming "pits" of lesser opaqueness. In this system, one pit corresponds to one bit of information, thereby creating the aformentioned high storage capacity. During the reproduction cycle, the focusing lens in the laser optical system is focused on the pits, such that the quantity of light reflected from or passed through the pits is detected and processed. The laser output is controlled during the reproduction cycle to maintain the configuration of the pits, that is, the relative power or intensity of the laser beam is not permitted to rise to the level of intensity used during the recordation cycle so that data retention is insured.

The recording and reproducing cycles of an optical disk device will now be described in greater detail in reference to the block diagram of FIG. 1 and the waveform diagrams of FIG. 2. This detailed discussion of the recording and reproducing cycles will explain the functional deficiencies of the standard optical disk device, thereby providing a basis for the present invention.

In the recordation of a binary data train such as "1 0 0 0 1 1 0 1 1", as shown in FIG. 2(a), a laser beam from a laser beam source 1 is applied to an optical modulator 2 as shown in FIG. 1. In the optical modulator 2, the laser beam is modulated with a recording signal with a waveform as indicated in FIG. 2(b). The modulated laser beam is applied to a recording optical system 3, a beam splitter 5 and a ¼ waveform plate 6, and is then focused upon a recording medium 8 by the lens 7, forming a recorded pit train as illustrated in FIG. 2(c).

In the reproduction mode, the laser beam source 1 emits a laser beam which is lower in power than the laser beam emitted in the recording mode. The laser beam thus emitted is not modulated, and advances along the same path as that which the laser beam advanced in the recordation mode. Since the recording medium 8 is irradiated by the reproduction laser beam, the irradiation light is converted into a reflection light beam signal, corresponding to the recording pit train. The reflection light beam signal is applied through a reproducing optical system 9 to a photodetector 10, the output of which is applied, as a reproducing signal, to an output terminal 11. The reproducing signal has a waveform as is indicated in FIG. 2(d). The reproducing signal of FIG. 2(d) is compared with a modulation signal having a waveform as shown in FIG. 2(e), resulting in a "read" data train as indicated in FIG. 2(f). In the recordation operation, the lens 7 is driven by a track controller 12 and a focus servo unit 13, such that the signal provided to photodetector 10 is stable at all times. The elements of the system of FIG. 1 are well established in the art so that the construction of the individual components is unnecessary.

In the operation of such a standard optical disk device, as described above, several deficiencies exist which impede efficient performance. In the case where a number of bits "0" appear successively, there are no adjacent signals, and therefore it is difficult to obtain a detection signal from the reproducing signal. This places a serious design constraint upon the reading circuit as a whole, in that a detection signal would have to be reintroduced for comparision purposes. This would in turn create the need for clocking circuits and other unnecessary hardware. The device as described would have a large bit error rate. Also, since one pit corresponds to one bit, as described above, it is necessary to provide a distance substantially equal to a pit length L between pits (see FIGS. 2(b) and 2(c)). Accordingly, one bit data is recorded over a length which is substantially equal to twice the pit length L, and thus the upper limit of the number of bits recorded per unitary area of the recording medium, i.e., the upper limit of a bit density, is predetermined.

To increase the bit density, signal processing can be carried out as indicated in FIG. 2(b'). Specifically, the pulse width of a recording signal corresponding to a bit "1" can be made coincident with the signal period. In this case, since one bit of data is recorded over a length equal to the pit length L, the pit density is about twice that in the above-described method. However, this signal processing method also produces a design constraint. When "1" signals appear continuously, a reproduction signal as indicated in FIG. 2(d') becomes a continuous pulse signal, again posing difficulties in obtaining a detection "window" signal from the reproducing signal (FIG. 2(d')).

Accordingly, an object of this invention is to provide a novel method in which the above-described difficulties accompanying the data recording and reproducing operations of an optical disk device are eliminated. More specifically, an object of the invention is to provide an optical data recording and reproducing method in which the bit density is high, a detection "window" signal can be readily obtained from a reproducing signal, and self-locking (or forming a "window" signal according to a reproducing signal, eliminating the need for independently introducing a detection signal) can be readily achieved.

SUMMARY OF THE INVENTION

The foregoing objects have been realized by the provision of an optical data recording and reproducing method in which data are written in a circular data recording medium by first applying a light beam which has been modulated with the data to the medium. Then a light beam lower in power than the light beam which was used in writing data to the medium is applied, such that the variation in intensity of the light beam, as reflected from or passed through the medium is detected to read the data. Reading may therefore be either transmissive or reflective. According to the invention, this recording is carried out by employing a modulation method in which the pulse width of the recording signal corresponding to data is set equal to at least a signal period, and the reproducing signal obtained in reproduction is differentiated to provide a detection "window" signal, and read data is obtained from sampling the differential signal with the detection signal.

BRIEF DESCRIPTION OF THE DRAWINGS

FIGS. 2(a)-(f) are diagrams of the various waveforms produced in connection with the conventional optical disk device;

FIGS. 3(a)-(h) are diagrams of the various waveforms produced in connection with the present invention.

DESCRIPTION OF THE PREFERRED EMBODIMENT

Figure 1:
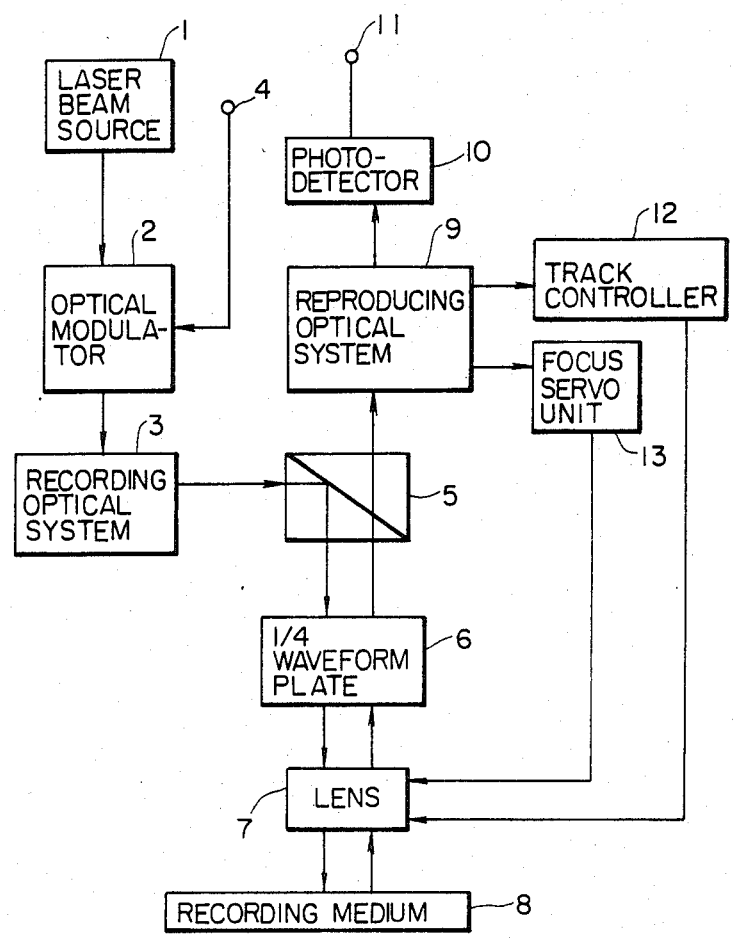
FIG. 1 is a block diagram of a conventional optical disk device.
Figure 2B:
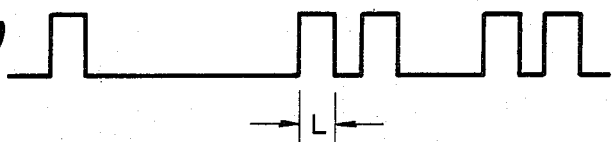
Figure 2C:
Figure 2D:
Figure 2E:

Since the invention is designed to apply to a standard optical disk device of FIG. 1, the invention shall be described by referring to the device shown in FIG. 1 unless otherwise specified.

Figure 3B:
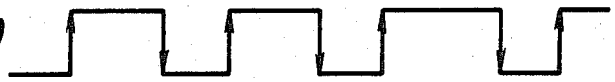
Figure 3C:
Figure 3D:
Figure 3E:
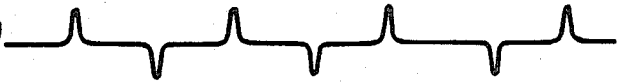
Figure 3F:
Figure 3G:
Figure 4:
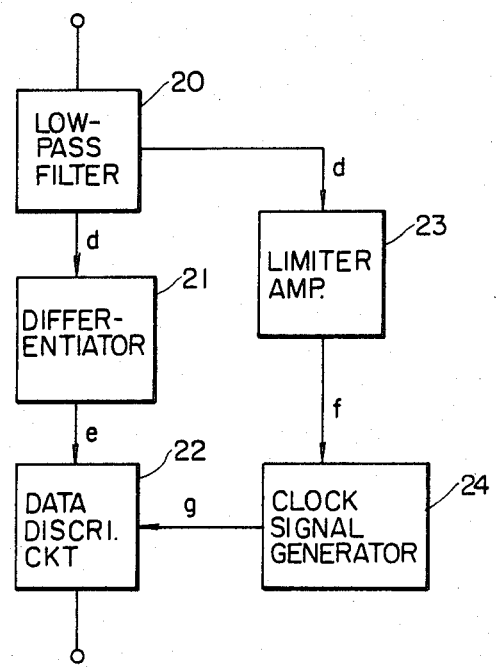
FIG. 4 is a block diagram showing an optical disk device employing the method of the present invention.

In recording a binary data train such as "1 0 0 0 1 1 0 1 1" as illustrated in FIG. 3(a), an input signal FIG. 3(b) is applied to the optical modulator 2. The input signal is a MFM (modified frequency modulation) signal, well known in the art. The signal is such that a bit "1" causes voltage variation, a bit "0" causes no voltage variation, and the boundary between adjacent bits "0" and "0" causes voltage variation. A recording pit train as in FIG. 3(c) is thereby formed on the recording medium 8. The reproducing signal is reflected from the medium as illustrated in FIG. 3(d) and applied through a low-pass filter 20 to a differentiator 21 as shown in FIG. 4. The signal is converted into a differentiation signal shown in FIG. 3(e). The reproducing signal FIG. 3(d) as applied through the low-pass filter 20 is also applied to a limiter amplifier 23, where it is converted into a pulse signal shown in FIG. 3(f). The pulse signal of FIG. 3(f) is supplied to a clock signal generating circuit 24, where it is converted into a detection "window" signal as in FIG. 3(g). The differentiation signal (e) and the detection "window" signal (g) are then subjected to comparison to a data discriminating circuit 22, resulting in the read of the data train of FIG. 3(h).

In the above-described manner, self-locking is achieved by the simple system of a limiter amplifier and a clock signal generator. Such self-locking eliminates the need for the independent introduction of a detection pulse waveform. It also increases the overall efficiency of the standard optical disk device by increasing the allowable rate of rotation of the disk itself. Also, efficiency has been enhanced by providing a modulation signal which allows one pit to correspond substantially to two bits of information, which doubles the information storage capacity of the conventional optical disk device in which one pit corresponds to only one bit of information.

What is claimed is:

1. An optical data recordation and reproduction system, comprising:

first optical means including modulation means wherein a beam of light from a source is frequency modulated by digital data such that a recording signal is produced corresponding to said digital data having a pulse width equal to at least a signal period, said modulated light impacting upon a photosensitive recording medium to produce discontinuities in said medium which correspond to the data to be recorded;

a second optical means, in which a beam of unmodulated light directed onto said photosensitive medium is received and is converted to an electrical signal; and an electrical circuit comprising a differentiator in which said electrical signal is differentiated and sampled to uncover said recorded data.

2. An optical data recordation and reproduction system as in claim 1, wherein said light beam used in both said first optical means and said second optical means originates from a common source.

3. An optical data recordation and reproduction system as in claim 1, in which said second optical means includes an electrical means which continually stabilizes said unmodulated light beam during operation of said second optical means.

4. An optical data recordation and reproduction system as in claim 1, further comprising modulation means for modifying the frequency modulation of said light in which the pulse width of a recording signal corresponding to said digital data is set equal to at least a signal period.

5. An optical data recording and reproduction system of claim 1 wherein said beam of unmodulated light is reflected from said recording medium and onto said second optical means, a photodector coupled to said second optical means for converting said reflected beam into an electrical signal or variations in intensity of said reflected beam.

6. An optical data recordation and reproduction system, comprising:

first optical means, in which a beam of light from a source is modulated by digital data to be recorded and impacts upon a photosensitive recording medium such that discontinuities in said medium are created which correspond to the data to be recorded;

a second optical means, in which a beam of unmodulated light directed onto said photosensitive medium is received and is converted to an electrical signal;

an electrical circuit comprising a differentiator in which said electrical signal is differentiated and sampled to uncover said recorded data; and modulation means for modifying the frequency modulation of said light in which the pulse width of a recording signal corresponding to said digital data is set equal to at least a signal period.

7. An optical data recordation and reproduction system as in claim 6, wherein said light beam used in both said first optical means and said second optical means originates from a common source.

8. An optical recordation and reproduction system as in claim 6, in which said second optical means includes an electrical means which continually stabilizes said unmodulated light beam during operation of said second optical means.

9. An optical data recording and reproduction system of claim 6, wherein said beam of unmodulated light is reflected from said recording medium and onto said second optical means, a photodetector coupled to said second optical means for converting said reflected beam into an electrical signal or variations in intensity of said reflected beam.

10. An optical data recordation and reproduction system, comprising:

first optical means including modulation means wherein a beam of light from a source is frequency modulated by digital data such that a recording signal is produced corresponding to said digital data having a pulse width equal to at least a signal period, said modulated light impacting upon a photosensitive recording medium to produce discontinuities in said medium which correspond to the data to be recorded;

a second optical means, in which a beam of unmodulated light directed onto said photosensitive medium is received and is converted to an electrical signal; and an electrical circuit, in which said electrical signal is differentiated and sampled to uncover said recorded data, comprising a low pass filter receiving said electrical signal, said filter producing an output to a differentiator and a limiter respectively, clock means receiving the output of said limiter and, discriminator means for comparing the output of said differentiator and a sampling signal from said clock means operation.

11. An optical data recordation and reproduction system, comprising:

first optical means, in which a beam of light from a source is modulated by digital data to be recorded and impacts upon a photosensitive recording medium such that discontinuities in said medium are created which correspond to the data to be recorded;

a second optical means, in which a beam of unmodulated light directed onto said photosensitive medium is received and is converted to an electrical signal;

an electrical circuit, in which said electrical signal is differentiated and sampled to uncover said recorded data comprising a low pass filter receiving said electrical signal, said filter producing an output to a differentiator and a limiter respectively, clock means receiving the output of said limiter and, discriminator means comparing the output of said differentiator and a sampling signal from said clock means operation; and modulation means for modifying the frequency modulation of said light in which the pulse width of a recording signal corresponding to said digital data is set equal to at least a signal period.

* * * * *